(12) United States Patent
Richards (10) Patent No.: US 7,643,231 B2
(45) Date of Patent: Jan. 5, 2010

(54) TILT ADJUSTMENT LOCKING MECHANISM FOR A HEAD-MOUNTED NIGHT VISION DEVICE

(75) Inventor: David Richards, Medford, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 21 days.

(21) Appl. No.: 11/946,181

(22) Filed: Nov. 28, 2007

(65) Prior Publication Data

US 2009/0135507 A1    May 28, 2009

(51) Int. Cl.
*G02B 7/02* (2006.01)

(52) U.S. Cl. ..................................... 359/815

(58) Field of Classification Search ......... 359/802–815, 359/399; 396/128
See application file for complete search history.

(56) References Cited

U.S. PATENT DOCUMENTS

| | | | |
|---|---|---|---|
| 4,660,943 A * | 4/1987 | Ellis | 359/362 |
| 6,442,352 B1 * | 8/2002 | Ito | 396/536 |
| 6,472,776 B1 * | 10/2002 | Soto et al. | 307/400 |
| 6,493,153 B2 * | 12/2002 | Funatsu | 359/694 |
| 6,662,370 B1 | 12/2003 | Buchanan, Jr. | |
| 6,924,931 B1 | 8/2005 | Lam et al. | |
| 7,018,102 B1 * | 3/2006 | Brotz | 384/99 |
| 7,035,020 B2 * | 4/2006 | Inamoto | 359/700 |

* cited by examiner

*Primary Examiner*—Ricky L Mack
*Assistant Examiner*—Vipin M Patel
(74) *Attorney, Agent, or Firm*—RatnerPrestia (57) ABSTRACT

A mechanism for permitting selective adjustment of the angular position of a head-mounted night vision device is provided. The mechanism comprises a housing positioned adjacent the night vision device. A shaft defining a longitudinal axis is at least partially positioned within or adjacent the housing. The shaft is rotatively coupled to the night vision device, wherein rotation of the shaft induces rotation of the night vision device. A moveable lever is coupled to the shaft for rotating the shaft. Means for selectively limiting rotation of the shaft are provided, wherein the means are moveable between a first position and a second position. In the first position the means permit rotation of the shaft and the optical device, and in the second position the means limit rotation of the shaft and the optical device.

8 Claims, 8 Drawing Sheets

TILT ADJUSTMENT LOCKING MECHANISM FOR A HEAD-MOUNTED NIGHT VISION DEVICE

TECHNICAL FIELD

The present invention relates to a locking mechanism for selectively fixing the rotational position of a field helmet mounted optical device, such as night vision binoculars.

BACKGROUND OF THE INVENTION

A binocular night vision device uses a pair of monocular night vision scopes which are mounted and associated with one another in such a way as to provide the user of the device with binocular vision, thereby allowing the user to have a night-time view with depth perception. Users typically operate the night vision device in a variety of positions, such as standing erect, lying flat on the ground, sitting in a cockpit of an airplane, hiding behind protective cover, and so forth. Given the wide variety of positions a user may operate a night vision device, many night vision devices include provisions for adjustably tilting (i.e., rotating) the night vision device with respect to the eye of the user to adapt the night vision device to the body orientation of the user. Furthermore, field helmet mounted optical devices may include provisions for locking the rotational position of the night vision device once the night vision device is rotated to a desired position.

In practice, night vision devices are often subject to violent external movements or environmental changes, such as temperature adjustments. For example, helmet mounted night vision devices used for aviation experience high and low frequency vibration, mechanical shock and multi-axis elevated G loads. Under those conditions, many conventional devices for retaining the night vision device in a fixed position are often inadequate for preventing the night vision device from drifting from its original setting with respect to the field helmet, thereby requiring constant readjustment of the night vision device.

In view of the foregoing, there is a continuing need to further develop and refine devices for selectively locking a helmet mounted night vision device in a fixed position, in the interests of performance, safety and convenience.

SUMMARY OF THE INVENTION

According to an aspect of the invention, a mechanism for permitting selective adjustment of the angular position of a head-mounted night vision device is provided. The mechanism comprises a housing positioned adjacent the night vision device. A shaft defining a longitudinal axis is at least partially positioned within or adjacent the housing. The shaft is rotatively coupled to the night vision device, wherein rotation of the shaft induces rotation of the night vision device. A moveable lever is coupled to the shaft for rotating the shaft. Means for selectively limiting rotation of the shaft are provided, wherein the means are moveable between a first position and a second position. In the first position the means permit rotation of the shaft and the optical device, and in the second position the means limit rotation of the shaft and the optical device.

According to another aspect of the invention, another mechanism for permitting selective adjustment of the angular position of a head-mounted optical device is provided. The mechanism comprises a stop positioned on the housing for selective engagement with a set of gear teeth provided on the moveable lever. Either the moveable lever or the stop are positionable between a deployed position and a retracted position. In the deployed position the set of gear teeth are separated from the stop to permit movement of the moveable lever, rotation of the shaft and rotation of the optical device. In the retracted position the set of gear teeth are engaged with the stop to limit movement of the moveable lever, rotation of the shaft and rotation of the optical device.

According to yet another aspect of the invention, the moveable lever includes either a resilient element or an aperture for receiving a resilient element. Either another resilient element or another aperture are positioned on the housing for selectively receiving the aperture or the resilient element of the moveable lever. The resilient element of the housing or the moveable lever is deformable for releasable engagement with the aperture of the moveable lever or the housing, respectively.

According to still another aspect of the invention, a magneto-rheological bearing is coupled to the shaft and the housing for selectively permitting rotation of the shaft. A magnet is slideably coupled to the housing for translating between a first position proximal to the bearing and a second position distal to the bearing, wherein in the proximal position the bearing limits rotation of the shaft, and in the distal position the bearing permits rotation of the shaft.

BRIEF DESCRIPTION OF THE FIGURES

The invention is best understood from the following detailed description when read in connection with the accompanying drawing. It is emphasized that, according to common practice, the various features of the drawing are not to scale. Included in the drawing are the following figures:

FIG. 2b is a bottom perspective view of the prior art housing of FIG. 2a.

DETAILED DESCRIPTION OF THE INVENTION

This invention will now be described with reference to several embodiments selected for illustration in the drawings. It will be appreciated that the scope and spirit of the invention are not limited to the illustrated embodiments.

Referring generally to the figures and according to an aspect of the invention, a mechanism for permitting selective adjustment of the angular position of a head-mounted night vision device 12 is provided. The mechanism comprises a housing 114, 214, 314 positioned adjacent the night vision device 12. A shaft 126 defining a longitudinal axis A2 is at least partially positioned within or adjacent the housing 114, 214, 314. The shaft 126 is rotatively coupled to the night vision device 12, wherein rotation of the shaft 126 induces rotation of the night vision device 12. A moveable lever 128, 228, 328 is coupled to the shaft 126 for rotating the shaft 126. Means 160 and 162, 270 and 272, 380 and 382 for selectively limiting rotation of the shaft 126 are provided, wherein the means 160 and 162, 270 and 272, 380 and 382 are moveable between a first position and a second position. In the first position the means permit rotation of the shaft and the optical device, and in the second position the means limit rotation of the shaft and the optical device.

According to another aspect of the invention, another mechanism for permitting selective adjustment of the angular position of a head-mounted optical device 12 is provided. The mechanism comprises a stop 164 positioned on the housing 114 for selective engagement with a set of gear teeth 166 provided on the moveable lever 128. Either the moveable lever 128 or the stop 164 are positionable between a deployed position and a retracted position. In the deployed position the set of gear teeth 166 are separated from the stop 164 to permit movement of the moveable lever 128, rotation of the shaft 126 and rotation of the optical device 12. In the retracted position the set of gear teeth 166 are engaged with the stop 164 to limit movement of the moveable lever 128, rotation of the shaft 126 and rotation of the optical device 12.

According to yet another aspect of the invention, the moveable lever 228 includes either a resilient element 272 or an aperture 270 for receiving a resilient element 272. Either another resilient element 272 or another aperture 270 are positioned on the housing 214 for selectively receiving the aperture 270 or the resilient element 272 of the moveable lever 228. The resilient element 272 of the housing 214 or the moveable lever 228 is deformable for releasable engagement with the aperture 270 of the moveable lever 228 or the housing 214, respectively.

According to still another aspect of the invention, a magneto-rheological bearing 380 is coupled to the shaft 126 and the housing 314 for selectively permitting rotation of the shaft 126. A magnet 382 is slideably coupled to the housing 314 for translating between a first position proximal to the bearing 380 and a second position distal to the bearing 380, wherein in the proximal position the bearing 380 limits rotation of the shaft 126, and in the distal position the bearing 380 permits rotation of the shaft 126.

Figure 1:
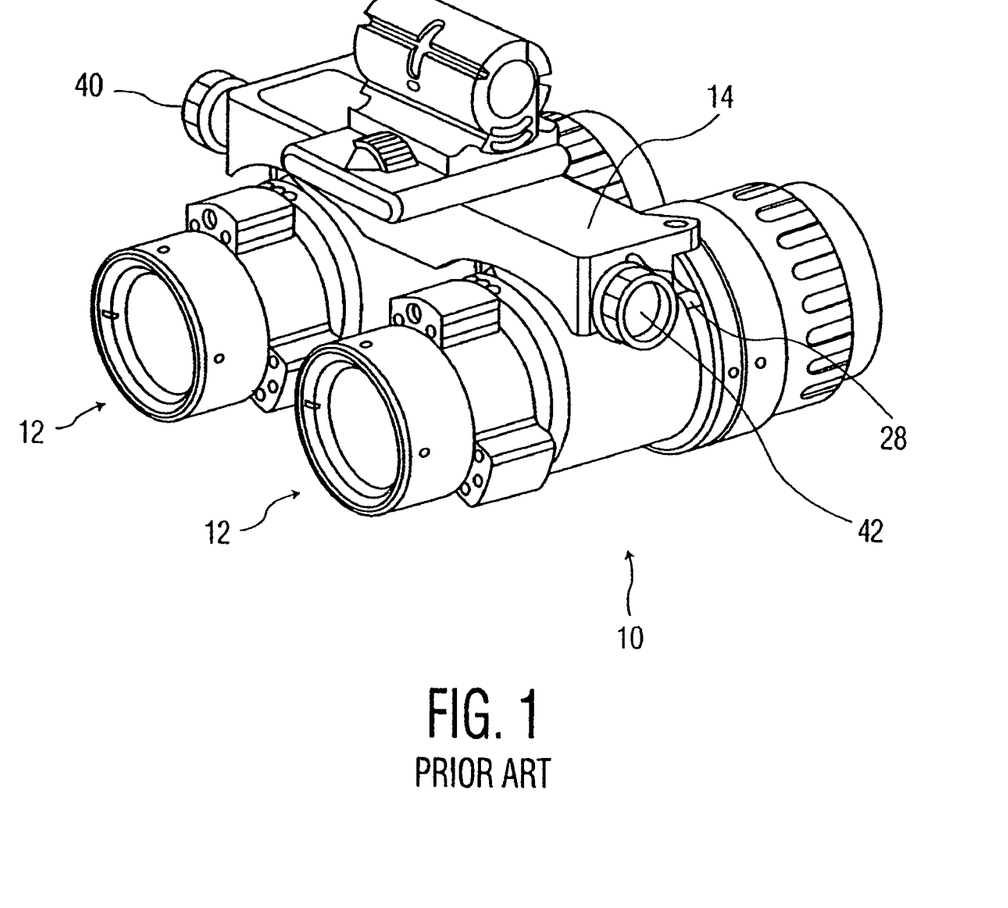
FIG. 1 is a perspective view of a prior art binocular night vision goggle.
Figure 2A:
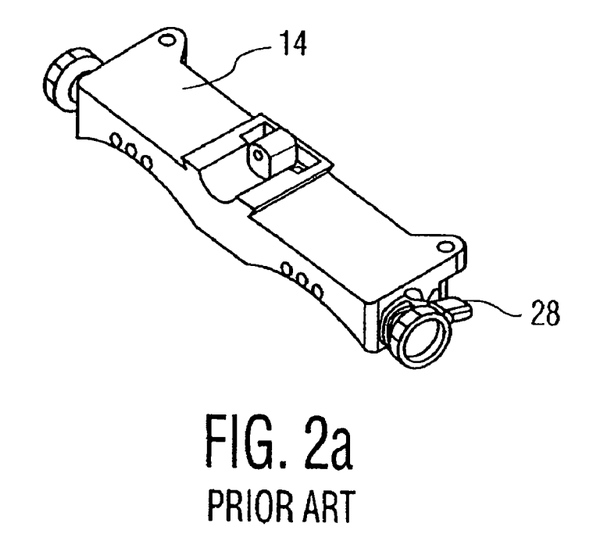
FIG. 2a is a top perspective view of a prior art housing for supporting the binocular night vision goggle of FIG. 1.
Figure 2B:
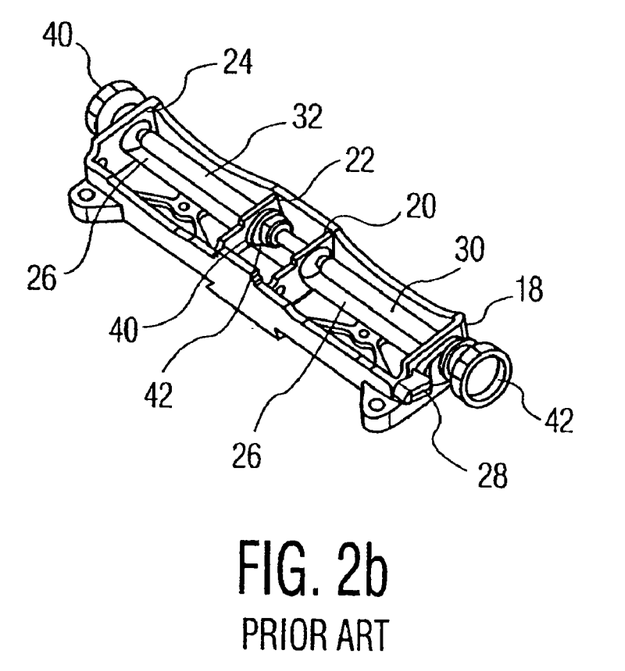
Figure 3:
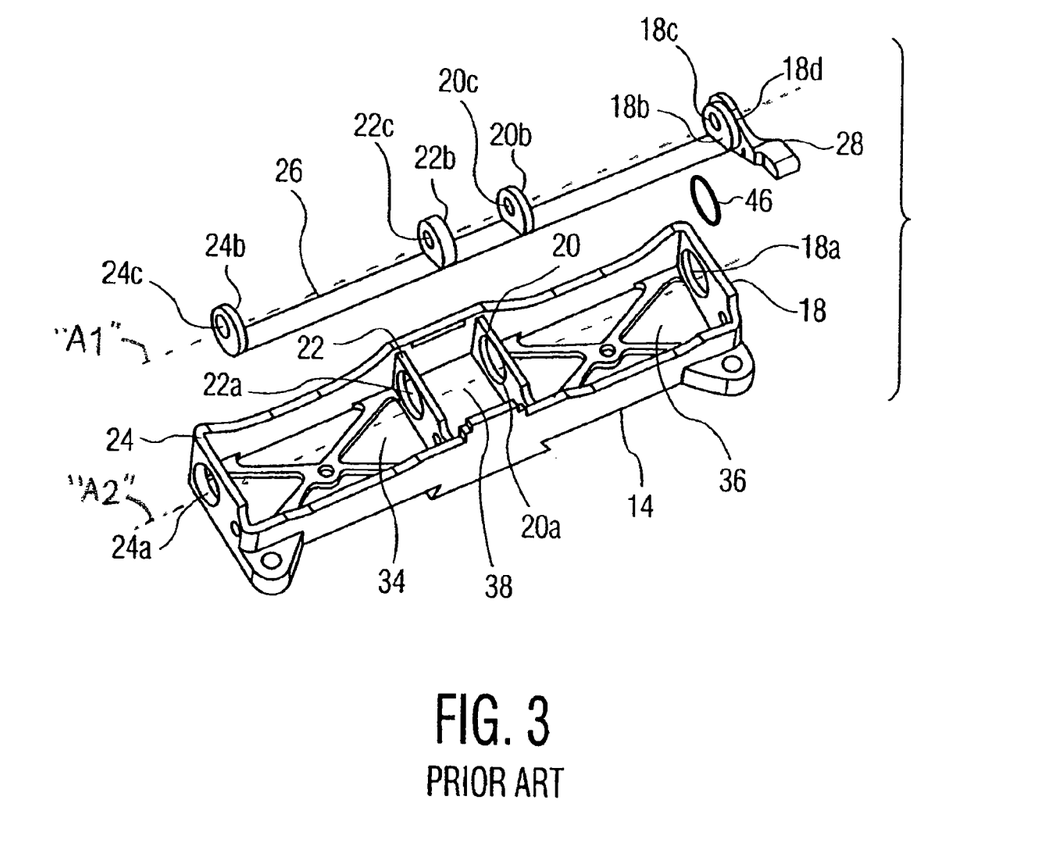
FIG. 3 is an exploded perspective view of the prior art housing, eccentric shaft, and o-ring of the prior art binocular night vision goggle of FIG. 1.

FIGS. 1-3 illustrate a prior art night vision device 10. The prior art night vision device 10 is also described in U.S. Pat. No. 6,924,931 to Lam et al., the contents of which are incorporated herein by reference in their entirety. As depicted in FIG. 1, prior art night vision device 10 includes a pair of night vision monoculars 12 which can be suspended in front of a user's eyes. The prior art night vision device 10 includes provisions for (1) tilting the monoculars, and (2) translating each monocular to adjust the horizontal spacing between the monoculars 12 to match the interpupillary distance (IPD) of a user. The interpupillary distance (IPD) is defined as the distance between the user's pupils.

More particularly, the night vision device 10 includes an IPD adjustment mechanism to permit adjustment of the horizontal spacing between the monoculars 12 to match the interpupillary distance (IPD) of a user. The IPD adjustment mechanism translates the monoculars toward each other and away from each other. The IPD adjustment mechanism is positioned in a housing 14 of prior art night vision device 10, as described hereinafter.

FIGS. 2a and 2b depict a top view and a bottom view of housing 14, respectively, omitting the binocular and the field helmet mounting component. The housing 14 is indirectly mounted to a field helmet (not shown). The housing 14 has a laterally elongated rectangular shape in plan view, and is also of a generally rectangular shape in both frontal and side elevation views.

As shown in FIGS. 2b and 3, the lower portion of housing 14 is divided into three sections 34, 36, 38 by four walls 18, 20, 22, and 24. A circular aperture is disposed inside each of walls 18, 20, 22, and 24. Specifically, aperture 18a is disposed in wall 18, aperture 20a is disposed in wall 20, aperture 22a is disposed in wall 22, and aperture 24a is disposed in wall 24. Apertures 18a, 20a, 22a and 24a define axis "A2."

Flanges 18b, 20b, 22b, and 24b of an eccentric shaft 26 are rotatably positioned in apertures 18a, 20a, 22a and 24a of housing 14, respectively. Eccentric shaft 26 is optionally a thin elongate blade having a rectangular cross-section, as shown in FIG. 3. Inside each of flanges 18b, 20b, 22b, 24b are off-center apertures 18c, 20c, 22c, and 24c defining axis "A1." In assembly axes A1 and A2 are radially misaligned.

A threaded shaft 30 is rotatably positioned in apertures 18c and 20c for adjustably controlling the interpupillary distance (IPD) of a single monocular. Similarly, a threaded shaft 32 is rotatably positioned in apertures 22c and 24c for adjustably controlling the interpupillary distance (IPD) of the adjacent monocular.

Referring still to FIGS. 2b and 3, a single monocular (not shown) is mounted onto threaded shaft 30. The monocular includes a threaded aperture 13 (see FIG. 4B) for receiving threaded shaft 30. One end of threaded shaft 30 extends through wall 18 of housing 14. Consequently, the free end of threaded shaft 30 extends from the space in section 36 at the underside of housing 14 to the outside of wall 18. The opposing end of threaded shaft 30 extends through aperture 20c in flange 20b, which is disposed in aperture 20a of wall 20. Consequently, this end of threaded shaft 30 extends from space 36 at the underside of housing 14 into the space in section 38.

A second monocular (not shown) is mounted onto threaded shaft 32. The monocular includes a threaded aperture for receiving threaded shaft 32. The threaded shaft 32 is rotatably received in apertures 22c and 24c of walls 22 and 24, respectively. One end of threaded shaft 32 extends through aperture 24c in flange 24b, such that the free end of threaded shaft 32 extends through wall 24 and outside of housing 14. The opposing end of threaded shaft 32 extends through aperture 22c in flange 22b, such that the end of shaft 32 extends into section 38.

As shown in FIG. 2b, the end of threaded shaft 32 that extends into space 38 is threaded and carries a washer member 40 which is secured axially on threaded shaft 32 by a threaded nut 42. Consequently, threaded shaft 32 is prevented from translating out of aperture 22c in flange 22b upon rotation of threaded shaft 32. Similarly, the end of threaded shaft 30 that extends into space 38 is threaded and carries a washer member (not shown) which is secured axially on the threaded shaft 30 by a threaded nut (not shown). Consequently, threaded shaft 30 is prevented from translating out of aperture 20c upon rotation of threaded shaft 30.

Control knobs 40 and 42 are coupled to the free ends of shafts 32 and 30, respectively, for rotating shafts 32 and 30 about axis A1 and translating the monoculars parallel to axis A1. Specifically, the free end of threaded shaft 32 that extends through wall 24 and outside of housing 14 is coupled to or extends from control knob 40. Similarly, the free end of threaded shaft 30 that extends through wall 18 and outside of housing 14 is coupled to or extends from control knob 42. In operation, when control knobs 42 and 40 are rotated, they respectively cause shafts 30 and 32 to rotate about axis A1 thereby translating the monoculars toward and away from each other along an axis parallel to axis A1 to adjust for varying eye separations. Because each of the monoculars 12 is respectively coupled to an independent shaft 30 or 32, the shafts 30 and 32 may be rotated independently of each other to translate a single monocular to adjust the IPD.

As noted previously, prior art night vision device 10 also includes provisions for tilting the monoculars. More particularly, rotation of eccentric shaft 26 causes rotation (i.e., tilt) of the monoculars about axis A2. A lever 28 extending from flange 18b of shaft 26 is provided for rotating eccentric shaft 26. The pivot lever 28 of the eccentric shaft 26 extends outwardly beyond one end of housing 14, as shown in FIGS. 2a and 2b. While shafts 30 and 32 are configured to rotate independent of eccentric shaft 26, rotation of eccentric shaft 26 causes movement of shafts 30 and 32 about axis "A2," thereby simultaneously tilting both monoculars 12 about axis A2. Axis A2 is oriented parallel and offset with respect to axis A1, the importance of which is described hereinafter.

Each of the flanges 18b, 20b, 22b, and 24b are connected together by eccentric shaft 26. In assembled form, flanges 18b, 20b, 22b, and 24b are positioned within respective apertures 18a, 20a, 22a and 24a defined within housing 14. The apertures 18a, 20a, 22a and 24a together define axis "A2." Each of flanges 18b, 20b, 22b, and 24b has an off-center aperture 18c, 20c, 22c, and 24c defined along axis A1. In assembled form, axis A2 is oriented parallel and offset with respect to axis A1.

Off-center apertures 18c and 20c receive threaded shaft 30 and off-center apertures 22c and 24c receive threaded shaft 32. Both shafts 30 and 32 are coupled to respective monoculars 12. Rotation of eccentric shaft 26 about axis A2 causes rotation of shafts 30 and 32 about axis A2, by virtue of the radial misalignment (i.e., eccentricity) between axes A1 and A2. Rotation of shafts 30 and 32 about axis A2 tilts the monoculars 12 about axis A2.

In other words, rotation of lever 28 of eccentric shaft 26 about axis A2 rotates flanges 18b, 20b, 22b, and 24b, shaft 30 and shaft 32 relative to housing 14 about axis A2. Because each of monoculars are coupled to shafts 30 and 32 and axes A1 and A2 are misaligned, rotation of lever 28 tilts each of the monoculars relative to housing 14 and relative to a user's eyes. Thus, eccentric shaft 26 and its associated flanges 18b, 20b, 22b, and 24b provides a means of tilting the line-of-sight of the two monoculars simultaneously. The lever 28 may be used to adjust the tilt of the monoculars to align with the user's line-of-sight.

As shown in FIG. 3, the prior art eccentric shaft 26 uses an o-ring 46 to provide rotational friction between the eccentric shaft 26 and the housing 14. The o-ring 46 is placed in a groove 18d of flange 18b, near adjustment lever 28. After the eccentric shaft 26 is assembled to the housing assembly, the purpose of the o-ring is to provide frictional resistance against the housing. The rotational friction force occurs between o-ring 46 and aperture 18a of wall 18 when flange 18b is inserted into aperture 18a. Thus, the o-ring acts as a frictional resistor between the eccentric shaft 26 and the housing 14. The frictional interface between o-ring 46 and aperture 18a is controlled by tight tolerances between flange 18b of eccentric shaft 26, housing 14, and o-ring 46. One of the purposes of the rotational friction provided by o-ring 46 is to minimize or prevent the night vision binocular from inadvertently tilting due to vibration. Another purpose is to provide a smooth resistance during adjustment of the rotational position of monoculars 12. The prior art device does not include a positive locking mechanism for preventing rotation of eccentric shaft 26.

Accordingly, there remains the possibility for eccentric shaft 26 to overcome the frictional resistance provided by o-ring 46. Consequently, monoculars 12 could inadvertently tilt upon being subjected to vibration or violent external movements. It is therefore necessary to provide a design that prevents, or at least better inhibits, eccentric shaft 26 from inadvertently rotating during operation of night vision device 10.

Figure 4A:
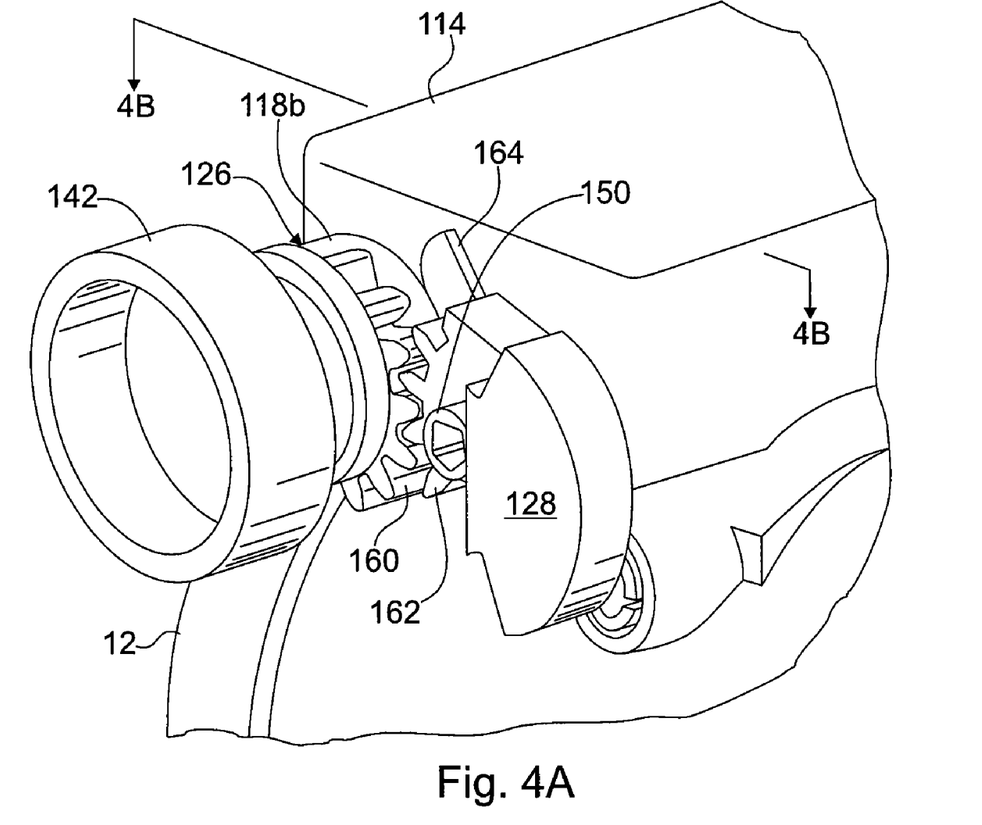
FIG. 4a depicts a front perspective view of a mechanism for locking the rotational position of the binocular night vision goggle of FIG. 1 according to a first exemplary embodiment of the invention, wherein the mechanism includes a spring loaded lever having gears for selectively rotating the eccentric shaft.
Figure 4B:
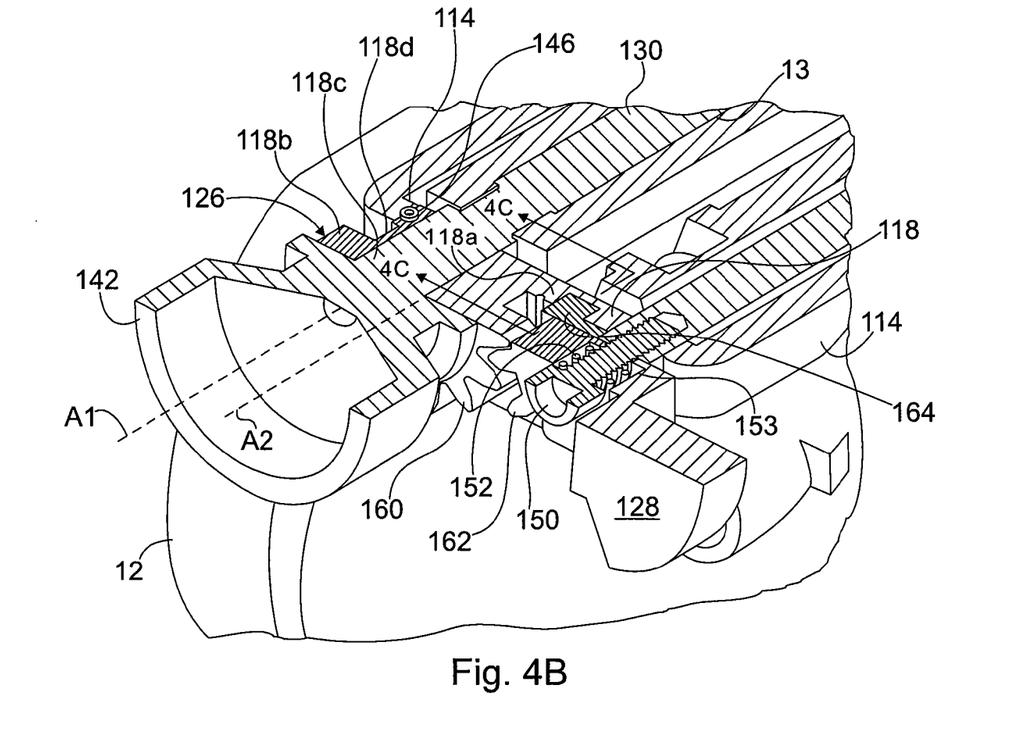
FIG. 4b depicts a cross-sectional view of the mechanism of FIG. 4a taken along the lines 4b-4b.
Figure 4C:
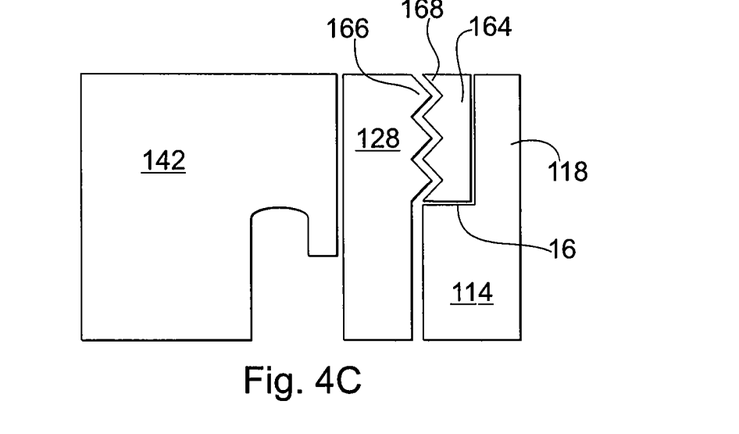
FIG. 4c depicts a cross-sectional view of the mechanism of FIG. 4b taken along the lines 4c-4c.

FIGS. 4a-4c depict a mechanism for tilting and locking the monoculars 12 according to a first exemplary embodiment of the invention. FIG. 4a depicts a front perspective view of the tilt mechanism. FIG. 4b depicts a cross-sectional view of the tilt mechanism of FIG. 4a taken along the lines 4b-4b. FIG. 4c depicts a cross-sectional view of the locking apparatus of FIG. 4b taken along the lines 4c-4c. The tilt mechanism of FIGS. 4a-4c is similar to the tilt mechanism of FIGS. 2a-3, however, the tilt mechanism of FIGS. 4a-4c includes provisions for locking the monoculars 12 in place.

As shown in FIGS. 4a and 4b, the tilt mechanism generally includes an eccentric shaft 126, similar to eccentric shaft 26 of FIG. 3. Rotation of eccentric shaft 126 adjusts the tilt of both monoculars 12 (one shown). A threaded shaft 130 integrally formed with control knob 142 is rotatably positioned through an aperture 118c provided in flange 118b of eccentric shaft 126. Similar to the prior art device, rotation of threaded shaft 130 about axis A1 does not induce rotation of eccentric shaft 126, however, rotation of eccentric shaft 126 about axis A2 induces rotation of threaded stud 130 about axis A2, by virtue of the radial misalignment (i.e., eccentricity) between off-center aperture 118c (defined along axis A1) of flange 118b and aperture 118a (defined along axis A2) of housing wall 118.

Unlike eccentric shaft 26 of FIG. 3, lever 128 is independent of flange 118b of eccentric shaft 126 and mounted to wall 118 of housing 114 by a fastener 150. While only flange 118b of eccentric shaft 126 is shown in FIGS. 4a and 4b, the remaining portion of eccentric shaft 126 is similar to that of eccentric shaft 26 shown in FIG. 3. The lever 128 and flange 118b each include a set of gears 162 and 160, respectively, for operative engagement. Rotation of gears 162 of lever 128 induces rotation of gears 160 of flange 118b consequently rotating eccentric shaft 126 and tilting the monoculars 12.

As shown in FIGS. 4a and 4b, the eccentric shaft 126 uses an o-ring 146 to provide rotational friction between eccentric shaft 126 and housing 114. The o-ring 146 is placed in a groove 118d of flange 118b. The o-ring 146 provides frictional resistance against housing 114. The rotational friction force occurs between o-ring 146 and aperture 118a of wall 118 when flange 118b is inserted into aperture 118a. Thus, o-ring 146 acts as a frictional resistor between eccentric shaft 126 and housing 114. Because friction between eccentric shaft 126 and housing 114 alone may not be sufficient to prevent inadvertent rotation of eccentric shaft 126, the tilt mechanism of FIGS. 4a and 4b include additional provisions for locking eccentric shaft 126 in place.

As best shown in FIG. 4c, lever 128 includes another set of gear teeth 166 for selectively engaging a set of gear teeth 168 defined on a stop 164. Interengagement between gear teeth 166 and 168 prevents inadvertent rotation of lever 128. By preventing rotation of lever 128, eccentric shaft 126 is also prevented from rotation by virtue of the engagement between gears 160 and 162 of the flange 118b and lever 128, respectively. Moreover, by preventing rotation of eccentric shaft 126, the monoculars 12 are prevented from tilting.

The gear teeth 166 of lever 128 are disposed on the rear surface of lever 128, whereas gear teeth 162 of lever 128 are disposed on a side surface of lever 128. It should be understood that gear teeth 162 and 166 are entirely separate and perform separate functions.

According to one aspect of the invention, stop 164 is fixedly mounted in a slot 167 formed in wall 118 of housing 114, and prevented from movement. Those skilled in the art will recognize that stop 164 may not be a separate component as shown. For example gear teeth 168 may extend from wall 118 of housing 114 to achieve the same result. Additionally, engagement between lever 126 and stop 164 is not limited to gears. Those skilled in the art will recognize that other ways of preventing respective rotation or translation between lever 126 and stop 164 exist.

The lever 128 is moveable between a deployed position (not shown) and a retracted position (shown in FIGS. 4b and 4c). In a deployed position, gear teeth 166 of lever 126 are separated from gear teeth 168 of stop 164 to permit rotation of lever 128 (causing rotation of shaft 126 and tilting of optical device 12). In a retracted position, as shown in FIGS. 4b and 4c, gear teeth 166 of lever 126 are engaged with gear teeth 168 of stop 164 to prevent rotation of lever 128 (preventing rotation of shaft 126 and tilting of optical device 12).

A spring 152 biases lever 128 to the retracted position shown in FIGS. 4b and 4c. The spring 152 is positioned in a recess 153 formed in lever 128 between the head of fastener 150 and a surface of lever 128. In the retracted position, spring 152 urges gear teeth 166 of lever 128 against gear teeth 168 of stop 164, thereby preventing rotation of lever 128.

According to one exemplary use of the invention, a user translates lever 128 away from housing 114 against the force of spring 152 to relocate lever 128 to a deployed position. Translating lever 128 away from housing 114 compresses spring 152 and separates gear teeth 166 of lever 126 from gear teeth 168 of stop 164. Upon separation of gear teeth 166 and 168, the user is free to rotate lever 126 in either a clockwise or a counter clockwise direction thereby rotating flange 118b of eccentric shaft 126 and tilting binoculars 12. The lever 26 returns to the stowed position once it is released, by virtue of the force of spring 152.

While in this exemplary embodiment stop 164 is fixed in place and lever 128 is moveable between a deployed position a retracted position, those skilled in the art will recognize that lever 128 may be fixed in place and stop 164 may be moveable between a deployed position and retracted position.

Figure 5:
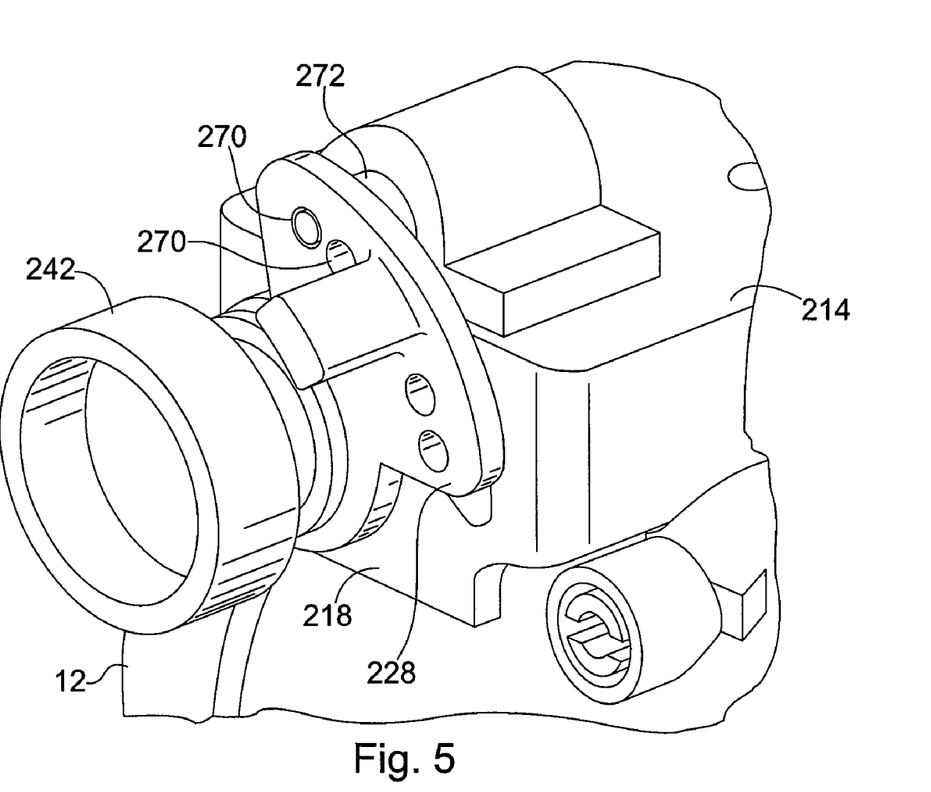
FIG. 5 depicts a front perspective view of another mechanism for locking the rotational position of the binocular night vision goggle of FIG. 1, according to a second exemplary embodiment of the invention, wherein the mechanism includes a lever having apertures for selectively receiving a spring element positioned on the housing.

FIG. 5 depicts a front perspective view and a rear perspective view, respectively, of a mechanism for selectively locking the rotational position of the binocular night vision goggle of FIG. 1, according to a second exemplary embodiment of the invention. Similar to the binocular tilt mechanism of FIGS. 4a-4c, the tilt mechanism of FIG. 5 includes provisions for locking the binoculars in place.

The tilt mechanism includes a lever 228 for rotating an eccentric shaft (not shown) to tilt the binoculars 12 with respect to the eye of the user. In this embodiment the lever 228 is integral with the eccentric shaft. A handle 229 is provided on lever 228 for rotating the lever 228. Similar to the binocular tilt mechanism of FIGS. 2a-3, and unlike the binocular tilt mechanism of FIGS. 4a-4c, lever 228 of FIG. 5 extends from a flange of the eccentric shaft, and a control knob 242 is positioned through an aperture (not shown) provided in lever 228 for rotating a threaded shaft (not shown) within housing 214 to control the PID of the binoculars.

The lever 226 includes a series of apertures 270 (four shown) for selective engagement with resilient element 272 positioned on housing 214. Upon rotation of lever 226, resilient element 272 positively engages (i.e., "snaps" into) a single aperture 270, thereby preventing further rotation of lever 226. It should be understood that rotation of lever 226 rotates the eccentric shaft positioned within housing 214 thereby tilting binoculars 12, as described with reference to the previous embodiments.

The apertures 270 may be circular thru-holes, as shown, or circular depressions formed on the rear surface of lever 226. The apertures 270 are sized to receive resilient element 272. The resilient element 272 is optionally a ball plunger positioned on side 218 of housing 214. Suitable ball plungers are sold and distributed by Monroe PMP, Incorporated of Auburn Hills, Mich., USA. Those skilled in the art will recognize that resilient element 272 may be a bearing or a spring loaded bearing at least partially extending beyond wall 218 of housing 214 for engaging an aperture 270 of lever 228. Additionally, resilient element 272 is not limited to being spring loaded.

Engagement between resilient element 272 and aperture 270 captivates lever 228 in a fixed position. A user can disengage resilient element 272 and aperture 270 by rotating lever 228 with sufficient force, so as to depress resilient element 272. Once resilient element 272 is depressed the user may rotate lever 228 until resilient element 272 engages an adjacent aperture 270. According to one aspect of the invention, the engagement force between resilient element 272 and aperture 270 is desirably high enough to resist inadvertent disengagement due to vibration, yet low enough to permit manual disengagement by a user rotating lever 228.

While lever 228 includes apertures 270 and housing 214 includes resilient element 272 in this exemplary embodiment, those skilled in the art will recognize that apertures 270 may be defined along housing 214 and resilient element 272 may be provided on lever 228 without departing from the scope of the invention.

Figure 6A:
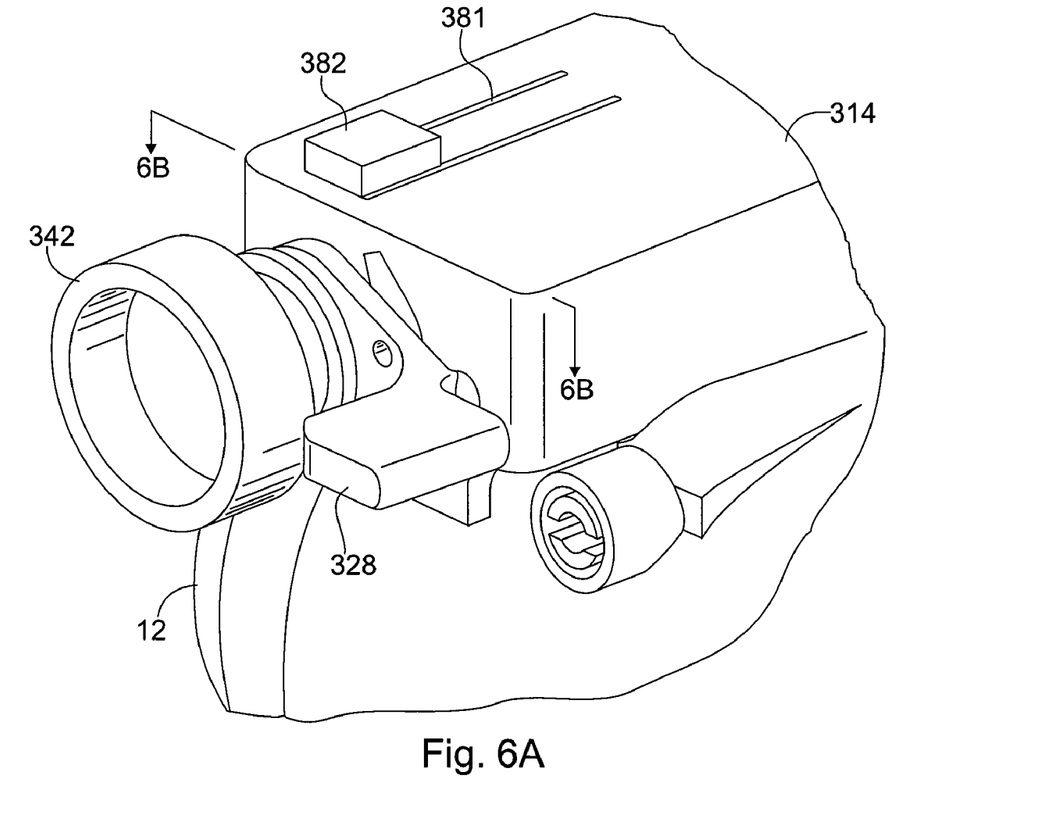
FIG. 6a depicts a front perspective view of yet another mechanism for locking the rotational position of the binocular night vision goggle of FIG. 1, according to a third exemplary embodiment of the invention, wherein a magnet is slideably coupled to the housing for selectively actuating a magneto-rheological bearing mounted between the shaft and the housing.
Figure 6B:
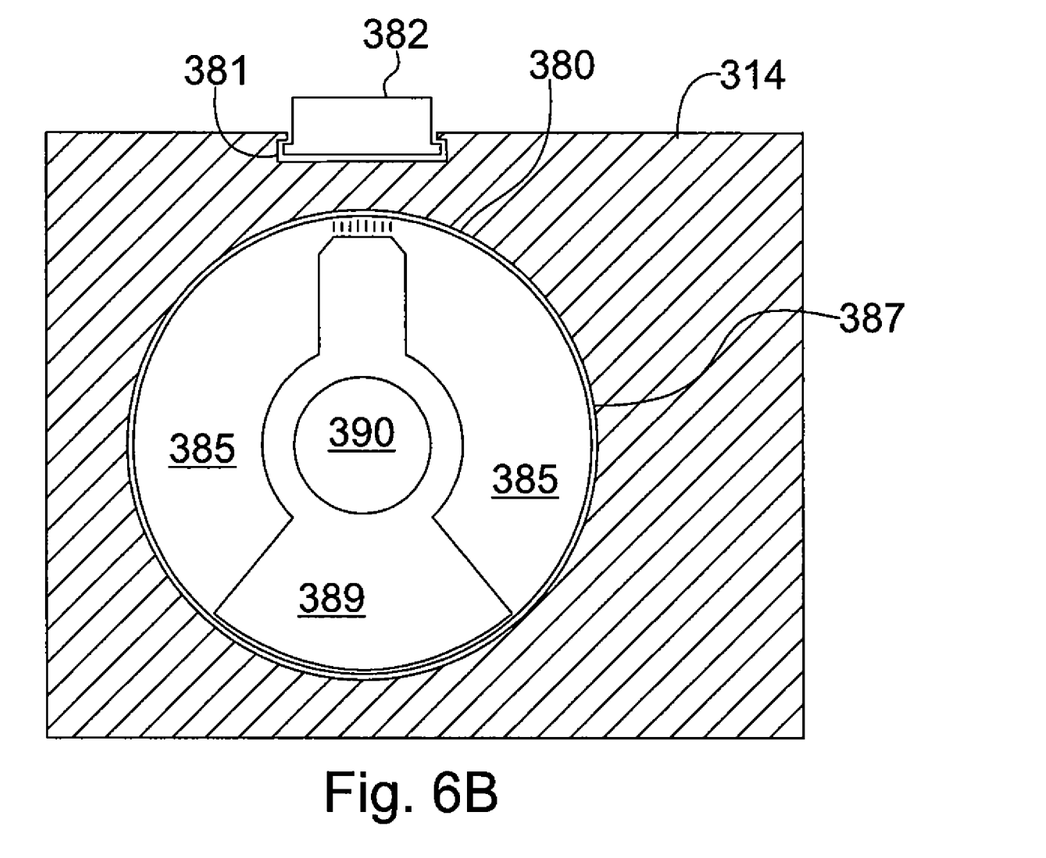
FIG. 6b depicts a cross-sectional view of the magneto-rheological bearing of FIG. 6a taken along the lines 6B-6B.

FIG. 6a depicts a front perspective view of a mechanism for locking the rotational position of the binocular night vision goggle of FIG. 1, according to a third exemplary embodiment of the invention. FIG. 6b depicts a cross-sectional view of a magneto-rheological bearing of FIG. 6a taken along the lines 6B-6B. Similar to the binocular tilt mechanisms of FIGS. 4a-4c and 5 the tilt mechanism of FIGS. 6a and 6b includes provisions for selectively locking the rotational position of monoculars 12.

The tilt mechanism generally includes a lever 328 for rotating an eccentric shaft (not shown) to tilt the binoculars 12 with respect to the eye of the user. A magneto-rheological (MR) bearing 380 is interoperably positioned between lever 328 and the eccentric shaft, such that rotation of lever 328 is transmitted through MR bearing 380 to induce rotation of the eccentric shaft. The MR bearing 380 includes an exterior casing 387 that is fixedly mounted to housing 314, thereby preventing rotation of exterior casing 387. A bearing shaft 389 is rotatably positioned about axis 390 within exterior casing 387 of bearing 380. The input end (not shown) of bearing shaft 389 is coupled to lever 328 and the output end (not shown) of bearing shaft 389 is coupled to the eccentric shaft (not shown) positioned within housing 314. As best shown in FIG. 6b, MR bearing 380 is filled with a magneto-rheological (MR) fluid 385. Upon being subject to a magnetic field, the viscosity of MR fluid 385 increases, to the point of becoming a viscoelastic solid. In a solid state, MR fluid 385 prevents rotation of shaft 389, thereby preventing rotation of lever 328, the eccentric shaft, and monoculars 12.

A magnet 382 is slideably positioned within a slot 381 formed on the top side of housing 314. The magnet 382 is slideably coupled to housing 314 for translating between a first position proximal to MR bearing 380, as shown in FIG. 6a, and a second position distal to MR bearing 380. In the proximal position, MR fluid 385 is subjected to a strong magnetic field and solidifies to limit rotation of shaft 389 of magnet 382, lever 328, the eccentric shaft, and binoculars 12. In the distal position of magnet 382, MR fluid 385 is not subjected to a strong magnetic field and remains in a liquid state thereby permitting rotation of shaft 389, lever 328, the eccentric shaft, and monoculars 12. The position of magnet 382 may be adjusted manually by the user.

Although the invention is illustrated and described herein with reference to specific embodiments, the invention is not intended to be limited to the details shown. Rather, various modifications may be made in the details within the scope and range of equivalents of the claims and without departing from the spirit of the invention.

What is claimed is:

1. A mechanism for permitting selective adjustment of the angular position of a head-mounted optical device, said mechanism comprising:

a housing positioned adjacent the optical device;

a shaft being at least partially positioned within or adjacent the housing, said shaft being rotatively coupled to the optical device, wherein rotation of said shaft induces rotation of the optical device with respect to said housing;

a moveable lever coupled to said shaft for rotating said shaft, said lever including a set of gear teeth; and a stop, separate from the moveable lever, positioned on said housing for selective engagement with said set of gear teeth of said moveable lever, said moveable lever or said stop being positionable between a deployed position and a retracted position, wherein in said deployed position said set of gear teeth are separated from said stop to permit movement of said moveable lever, rotation of said shaft and rotation of the optical device, and in said retracted position said set of gear teeth are engaged with said stop to limit movement of said moveable lever, rotation of said shaft and rotation of the optical device.

2. The mechanism of claim 1 further comprising a magneto-rheological bearing coupled to said shaft and said housing for selectively permitting rotation of said shaft; and a limiter comprising a magnet coupled to said housing for limiting rotation of said shaft and permitting rotation of said shaft.

3. The mechanism of claim 1 further comprising a first set of gear teeth defined on said shaft and a second set of gear teeth defined on said moveable lever and positioned in engagement with said first set of gear teeth, wherein rotation of said moveable lever induces rotation of said shaft about its longitudinal axis.

4. The mechanism of claim 3, wherein said second set of gear teeth of said moveable lever are spaced from said first set of gear teeth of said moveable lever.

5. The mechanism of claim 1, said stop comprising gear teeth defined on a surface of said mechanism extending from a field helmet for engagement with said set of gear teeth of said moveable lever.

6. The mechanism of claim 1, said lever being biased by a spring to said retracted position.

7. The mechanism of claim 1, wherein the head-mounted optical device is a night vision device.

8. The mechanism of claim 1, wherein said moveable lever is fixed in position upon engagement with the stop.

* * * * *